(12) United States Patent
Liu et al.

(10) Patent No.: US 12,521,009 B2
(45) Date of Patent: Jan. 13, 2026

(54) VISION DETECTION APPARATUS AND METHOD

(71) Applicant: NINGBO FLO OPTICAL TECHNOLOGY DEVELOPMENT CO., LTD., Ningbo (CN)

(72) Inventors: Yibing Liu, Ningbo (CN); Zhao Sun, Ningbo (CN); Liwei Liu, Ningbo (CN); Chao Li, Ningbo (CN)

(73) Assignee: NINGBO FLO OPTICAL TECHNOLOGY DEVELOPMENT CO., LTD., Ningbo (CN)

( * ) Notice: Subject to any disclaimer, the term of this patent is extended or adjusted under 35 U.S.C. 154(b) by 312 days.

(21) Appl. No.: 18/473,165

(22) Filed: Sep. 22, 2023

(65) Prior Publication Data

US 2025/0025041 A1 Jan. 23, 2025

(30) Foreign Application Priority Data

Jul. 17, 2023 (CN) .......................... 202310872710.2

(51) Int. Cl.
*A61B 3/10* (2006.01)
*A61B 3/00* (2006.01)
*A61B 3/103* (2006.01)

(52) U.S. Cl.
CPC ............ *A61B 3/103* (2013.01); *A61B 3/0008* (2013.01); *A61B 3/0016* (2013.01); *A61B 3/0091* (2013.01); *A61B 3/1005* (2013.01)

(58) Field of Classification Search
CPC ..... A61B 3/103; A61B 3/0008; A61B 3/0016; A61B 3/0091; A61B 3/1005
USPC ........ 351/205, 206, 209, 210, 211, 221, 246
See application file for complete search history.

(56) References Cited

U.S. PATENT DOCUMENTS

| 2007/0291229 A1* | 12/2007 | Yamaguchi | A61B 3/14 351/221 |
| 2024/0156339 A1* | 5/2024 | Okada | A61B 3/18 |

FOREIGN PATENT DOCUMENTS

JP 2008167777 A * 7/2008 ........... A61B 3/1005

* cited by examiner

*Primary Examiner* — Mahidere S Sahle
(74) *Attorney, Agent, or Firm* — Getech Law LLC; Jun Ye

(57) ABSTRACT

A vision detection apparatus is provided which comprises an eye lens, and the followings which are juxtaposed, with the eye lens as a common component: an ocular axial length measurement light path for measuring an ocular axial length of a detected eye; a diopter detection light path for obtaining refractive error information of the tested eye; an optotype light path for providing a fixation image for the detected eye 1 and enabling the detected eye to gaze stably; an eye position monitoring light path for performing three-dimensional positioning for the detected eye and collect imaging information of the detected eye. Through the present disclosure, it is possible to obtain information on refractive errors in the eyes, measure the anterior and posterior segment regions, and obtain eye parameters such as axial length, which has high practical value in vision detection of the teenagers.

7 Claims, 2 Drawing Sheets

VISION DETECTION APPARATUS AND METHOD

This application is based upon and claims priority to Chinese Patent Application No. 202310872710.2, filed on Jul. 17, 2023, the entire contents of which are incorporated herein by reference.

TECHNICAL FIELD

The present disclosure relates to the field of ophthalmology and technologies and in particular to a vision detection apparatus and method.

BACKGROUND

The myopia of human eyes mainly comprises refractive myopia and axial myopia. The refractive myopia mainly results from excessive curvature of the cornea or lens of the eyes or abnormal combination of various refractive components. In contrast, the axial myopia mainly results from extended ocular axis, the length of which goes beyond the normal range, where the negative diopters will usually increase by 200-300 degrees for increase of each 1 mm for the ocular axis. For the myopia resulting from different causes, different preventive measures should be taken. Measurement of the ocular axial length is an important factor for myopia prevention.

In recent years, along with technical development and popularization of electronic products, and more attention paid by the parents to the study of the children, the myopia rate in primary and middle schools is on increase. In 2014, the students suffering from myopia in the primary schools, junior high schools and senior high schools across the country reached more than 100 million. Myopia has become a significant public health problem which affects the eye health of the teenagers In China.

For the purpose of carrying out prevention and control on the myopia of the teenagers, in addition to performing basic objective vision monitoring, monitoring for refractive error and ocular axial length should also be performed. In the prior arts, a method and apparatus for performing synchronous measurement on refractive error and ocular axial length is provided. This technical solution combines the time domain optical coherence tomography with Hartmann wavefront detection technology to realize joint detection on ocular axial length and refractive error, providing technical support for screening myopia cases. This solution cannot carry out effective and accurate determination on the ocular diopters and ocular axial length for the teenagers with weak fixation capability, further weakening the practical value of it in the myopia detection of the teenagers. Further, this technical solution also cannot perform synchronous collection on anterior segment images and posterior segment images, and the device manufacturing costs are also high.

SUMMARY

In order to overcome the defects in the prior arts, the present disclosure provides a low-cost vision detection apparatus and method combining four light paths.

The technical solution of the vision detection apparatus provided by the present disclosure is described below.

There is provided a vision detection apparatus, which includes an eye lens and also includes the followings which are juxtaposed, with the eye lens as a common component:

an ocular axial length measurement light path for measuring an ocular axial length of a detected eye;

a diopter detection light path for obtaining refractive error information of the tested eye;

an optotype light path for providing a fixation image for the detected eye 1 and enabling the detected eye to gaze stably;

an eye position monitoring light path for performing three-dimensional positioning for the detected eye and collect imaging information of the detected eye.

Compared with the prior arts, the technical solution provided by the present disclosure can bring at least the following beneficial effects: by juxtaposing the ocular axial length measurement light path, the diopter detection light path, the optotype light path, the eye position imaging light path, during an eye vision measurement, as required, the ocular axial length of the detected eye can be obtained by using the ocular axial length measurement light path, the eye position information can be determined by using the eye position imaging light path, the detected eye can be enabled to gaze stably by using the optotype light path, and the refractive error information of the detected eye can be obtained by using the diopter detection light path. In the process of obtaining the refractive error information, a fixation image can be provided in real time to enable the detected eye to gaze stably, and thus it is more suitable for performing vision detection on children and teenagers. Furthermore, during ocular axis measurement, it is not required to quickly switch light paths nor use vibrating lens to carry out light path switching for anterior segment and posterior segment, thus reducing the difficulty in adjustment of light path consistency, and greatly reducing the costs. Therefore, this technical solution can accurately determine the ocular diopter and the ocular axial length, which has high practical value in vision detection of the teenagers.

Preferably, the ocular axial length measurement light path comprises:

a light source component for generating a measurement light;

a light splitter, disposed on a propagation path of the measurement light to receive the measurement light and split the measurement light into a reflective light and a transmission light;

a first prism, disposed on a propagation path of the reflective light to reflect the reflective light to form a fundus information collection light retroreflection and transmitted through the light splitter;

a movable prism component, disposed on a propagation path of the transmission light to reflect the transmission light to form a cornea information collection light retroreflection and reflected by the light splitter;

a first spectroscope, disposed on a propagation path of a transmission light generated by the fundus information collection light transmitted through the light splitter to reflect the transmission light generated by the fundus information collection light through the light splitter and the reflective light generated by the cornea information collection light using the light splitter to form an ocular axis information collection light emitted;

an optical line defining module, disposed on a propagation path of the ocular axis information collection light to introduce the ocular axis information collection light into the detected eye and reflected by the fundus and cornea of the detected eye back to form an ocular axis information reflective light retroreflected to the first spectroscope;

a measurement signal receiving module, disposed on a propagation path of the transmission light generated by the ocular axis information reflective light through the first spectroscope to receive interference information of the transmission light generated by the ocular axis information reflective light through the first spectroscope.

With this disposal, after the cornea information collection light and the fundus information collection light are generated, the cornea information collection light can be transmitted into the detected eye through the light splitter, the first spectroscope and the optical line defining module.

Coupled with the movable prism component which can move back and forth for adjustment, the anterior segment information, especially the cornea position information, can be effectively collected. Furthermore, the fundus signal can be configured to be transmitted through the light splitter, the first spectroscope, and the optical line defining module into the fundus of the detected eye. Next, the anterior segment signal and the interference signal of the fundus information collection light are received by the measurement signal receiving module, and based on light interference law, the ocular axial length of the detected eye can be calculated easily.

Preferably, the light source component comprises a light source for generating the measurement light and a first lens disposed on a propagation path of the measurement light. In this way, the light emitted by the light source can be collimated by a collimating lens into parallel beams which enter the light splitter for processing.

Preferably, the movable prism component comprises a motor slide bench internally provided with a control system and a second prism disposed on the motor slide bench. The motor slide bench is used to drive the second prism. With this disposal, the second prism is driven by the motor slide bench and the control system (e.g. a servo motor system) in the motor slide bench can achieve control on a drive distance and a position of the second prism, so as to achieve automatic control on the ocular axis measurement.

Preferably, the optical line defining module comprises a first reflector, a second spectroscope and the eye lens disposed along the propagation direction of the ocular axis information collection light. Further, the ocular axis information collection light is reflected by the first spectroscope, and then reflected by the first reflector and the second spectroscope into the detected eye and then focused in the anterior segment zone and the fundus and reflected back along the original path.

Preferably, the measurement signal receiving module comprises a second lens and an interference detector disposed along the propagation direction of the transmission light generated by the ocular axis information reflective light through the first spectroscope. In this way, the ocular axis information collection light transmitted through the first spectroscope can be focused by the second lens and its interference signal can be detected by the interference detector and thus the ocular axial length can be obtained.

Preferably, the diopter detection light path comprises a movable diopter detection light source for sending a diopter detection light, and a movable focusing lens, a movable annular diaphragm, a third lens, a medium-hole reflector, a third spectroscope, the second spectroscope, a fourth spectroscope and the eye lens disposed along the propagation direction of the diopter detection light.

After the diopter detection light enters the detected eye, it is reflected by the fundus of the detected eye to form a diopter detection reflective light which is transmitted by the medium-hole reflector. The diopter detection light path further comprises a second reflector, a fourth lens, a first movable lens, a fifth lens and a first image sensor disposed along the propagation direction of the diopter detection reflective light transmitted by the medium-hole reflector.

With the disposal of the light paths, the refractive error information of the detected eyes of various groups of people especially the teenagers can be collected smoothly by annular confocal means to achieve refractive error measurement; the disposal of these elements can greatly reduce the costs.

Preferably, the optotype light path comprises a movable optotype for generating a fixation light signal as well as a sixth lens, the third spectroscope, the second spectroscope, the fourth spectroscope and the eye lens disposed along the propagation direction of the fixation light signal. In this way, a fixed observation target can be provided to a subject to help the collection of the refractive error information of the detected eye.

Preferably, the eye position monitoring light path comprises a first periocular illumination light source and a second periocular illumination light source, where the first periocular illumination light source and the second periocular illumination light source irradiate the detected eye to form a reflective irradiation light signal. The eye position imaging light path further comprises the eye lens, the fourth spectroscope, a seventh lens, and a second image sensor disposed along the propagation direction of the reflective irradiation light signal as well as an eye illumination light source and a position detector disposed obliquely symmetrical about the central axis of the detected eye. The second image sensor is used to monitor the position of the detected eye and direct the operator and the subject to align the detected eye with the central axis of the eye lens. The position detector is used to monitor the back and forth position of the detected eye relative to the eye lens. In this way, the position information of the detected eye can be obtained smoothly to realize three-dimensional positioning.

The technical solution of the vision detection method provided by the present disclosure is described below.

There is provided a vision detection method, which, based on the vision detection apparatus provided by the present disclosure, includes the following steps:

At step 1, the operator uses the eye position imaging light path to determine the position of the detected eye and complete position alignment of the detected eye.

At step 2, the detected eye is enabled to gaze stable by using the optotype light path; refractive error information detection is performed on the detected eye using the diopter detection light path to obtain a refractive error information detection result corresponding to the detected eye.

At step 3, by using the ocular axial length measurement light path, interference information of the reflective light formed by the fundus and cornea of the detected eye is collected.

At step 4, based on the refractive error information detection result and the ocular axial length, conclusion is made on the vision of the detected eye.

Compared with the existing technology, the technical solution provided by the present disclosure can bring at least the following beneficial effects: based on the vision detection apparatus provided by the technical solution of the present disclosure, in this solution, diopter measurement is firstly performed and then retina image is collected, and then an ocular axial length is obtained. The costs are greatly reduced during measurement of the diopter and the ocular axial length, and evaluation on the myopia of the teenagers can be performed with high accuracy.

Figure 1:
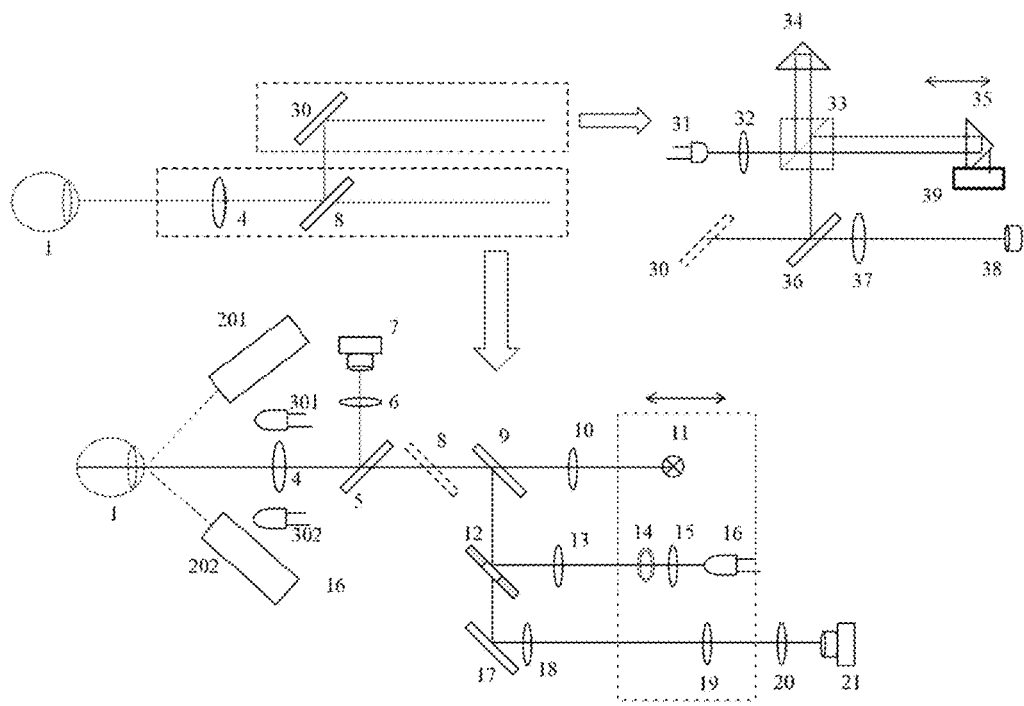
FIG. 1 is a structural schematic diagram illustrating a light path of a vision detection apparatus according to an embodiment of the present disclosure.
Figure 2:
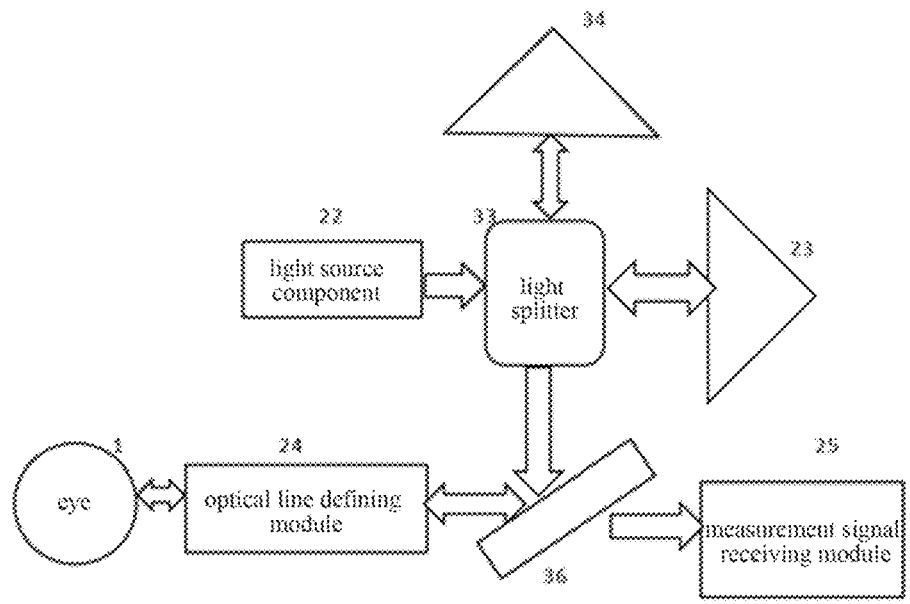
FIG. 2 is a schematic diagram illustrating an ocular axial length measurement light path of a vision detection apparatus according to an embodiment of the present disclosure.
Figure 3:
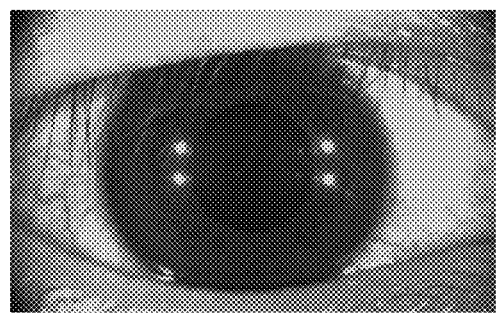
FIG. 3 is a periocular image obtained by a vision detection apparatus according to the present disclosure.
Figure 4:
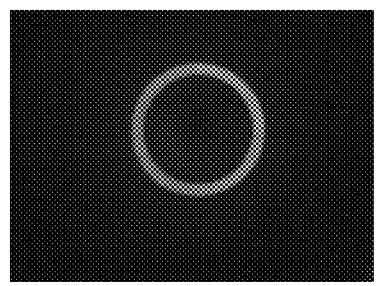
FIG. 4 is a fundus-reflected annular image obtained a vision detection apparatus according to the present disclosure.

The numerals of the drawings are described below: 1. detected eye, 4. eye lens, 5. fourth spectroscope, 6. seventh lens, 7. second image sensor, 8. second spectroscope, 9. third spectroscope, 10. sixth lens, 11. movable optotype, 12. medium-hole reflector, 13. third lens, 14. movable annular diaphragm, 15. movable focusing lens, 16. movable diopter detection light source, 17. second reflector, 18. fourth lens, 19. first movable lens, 20. fifth lens, 21. first image sensor, 22. light source component, 23. movable prism component, 24. optical line defining module, 25. measurement signal receiving module, 30. first reflector, 31. light source, 32. first lens, 33. light splitter, 34. first prism, 35. second prism, 36. first spectroscope, 37. second lens, 38. interference detector, 39. motor slide bench, 201. eye illumination light source, 202. position detector, 301. first periocular illumination light source, and 302. second periocular illumination light source.

DETAILED DESCRIPTIONS OF EMBODIMENTS

The technical solutions of the embodiments of the present disclosure will be clearly and fully described below in combination with the drawings of the embodiments of the present disclosure.

An embodiment of the present disclosure provides a vision detection apparatus, which comprises an eye lens 4 and also comprises the followings which are juxtaposed with the eye lens 4 as a common component:
- an ocular axial length measurement light path for measuring an ocular axial length of a detected eye 1;
- a diopter detection light path for obtaining refractive error information of the tested eye 1;
- an optotype light path for providing a fixation image for the detected eye 1 and enabling the detected eye 1 to gaze stably;
- an eye position monitoring light path for performing three-dimensional positioning for the detected eye 1 and collect imaging information of the detected eye 1.

In this embodiment, the ocular axial length measurement light path comprises:
- a light source component 22 for generating a measurement light;
- a light splitter 33, disposed on a propagation path of the measurement light to receive the measurement light and split the measurement light into a reflective light and a transmission light;
- a first prism 34, disposed on a propagation path of the reflective light to reflect the reflective light to form a fundus information collection light retroreflection and transmitted through the light splitter 33;
- a movable prism component 23, disposed on a propagation path of the transmission light to reflect the transmission light to form a cornea information collection light retroreflection and reflected by the light splitter 33;
- a first spectroscope 36, disposed on a propagation path of the transmission light generated by the fundus information collection light transmitted through the light splitter 33 to reflect the transmission light generated by the fundus information collection light through the light splitter 33 and the reflective light generated by the cornea information collection light using the light splitter 33 to form an ocular axis information collection light emitted;
- an optical line defining module 24, disposed on a propagation path of the ocular axis information collection light to introduce the ocular axis information collection light into the detected eye 1 and reflected by the fundus and cornea of the detected eye 1 back to form an ocular axis information reflective light retroreflected to the first spectroscope 36;
- a measurement signal receiving module 25, disposed on a propagation path of the transmission light generated by the ocular axis information reflective light through the first spectroscope 36 to receive interference information of the transmission light generated by the ocular axis information reflective light through the first spectroscope 36.

The reflective light is reflected by the first prism 34 to form the fundus information collection light retroreflection and transmitted by the light splitter 33; the transmission light is reflected by the movable prism component 23 to form the cornea information collection light retroreflection and reflected by the light splitter 33 and combined with the fundus information collection light into the ocular axis information collection light for transmission; the light splitter 33, the first spectroscope 36 and the optical line defining module 24 are disposed along the propagation direction of the ocular axis information collection light; the ocular axis information collection light is introduced into the detected eye and reflected by the anterior segment zone and the fundus of the detected eye to form the reflective ocular axis information collection light and transmitted by the first spectroscope 36; the first spectroscope 36 and the measurement signal receiving module 25 are disposed along the propagation direction of the reflective ocular axis information collection light.

In this embodiment, the light source component 22 comprises a light source 31 and a first lens 32 disposed along the propagation direction of the measurement light. The movable prism component 23 comprises a motor slide bench 39 internally provided with a servo control system and a second prism 35 disposed on the motor slide bench 39. The optical line defining module 24 comprises a first reflector 30, a second spectroscope 8 and the eye lens 4 disposed along the propagation direction of the ocular axis information collection light. The measurement signal receiving module 25 comprises a second lens 37 and an interference detector 38 disposed along the propagation direction of the transmission light generated by the ocular axis information reflective light through the first spectroscope 36. The interference detector 38 is a photoelectric detector such as PD, APD or PMT.

In this embodiment, the diopter detection light path comprises a movable diopter detection light source 16 for sending a diopter detection light, and a movable focusing lens 15, a movable annular diaphragm 14, a third lens 13, a medium-hole reflector 12, a third spectroscope 9, the second spectroscope 8, a fourth spectroscope 5 and the eye lens 4 disposed along the propagation direction of the diopter detection light.

The diopter detection light is introduced into the detected eye 1 and then reflected by the fundus of the detected eye 1 to form a diopter detection reflective light which is transmitted by the medium-hole reflector 12, and a part of light is transmitted through a light-through hole of the medium-hole reflector 12.

The diopter detection light path further comprises a second reflector 17, a fourth lens 18, a first movable lens 19, a fifth lens 20 and a first image sensor 21 disposed along the propagation direction of the diopter detection reflective light transmitted by the medium-hole reflector 12.

In this embodiment, the optotype light path comprises a movable optotype 11, a sixth lens 10, the third spectroscope 9, the second spectroscope 8, the fourth spectroscope 5 and the eye lens 4 disposed along the propagation direction of the fixation light signal. The movable optotype 11, the movable diopter detection light source 16, the movable focusing lens 15, the movable annular diaphragm 14, and the first movable lens 19 are configured as synchronous movement, which provides object-image conjugate environment.

In this embodiment, the eye position monitoring light path comprises a first periocular illumination light source 301 and a second periocular illumination light source 302, where the first periocular illumination light source 301 and the second periocular illumination light source 302 irradiate the detected eye to form a reflective irradiation light signal. The eye position imaging light path further comprises the eye lens 4, the fourth spectroscope 5, a seventh lens 6, and a second image sensor 7 disposed along the propagation direction of the reflective irradiation light signal as well as an eye illumination light source 201 and a position detector 202 disposed obliquely symmetrical about the central axis of the detected eye 1. The second image sensor 7 is an area array image sensor by which the position of detected eye can be accurately determined to align the center of the detected eye with the optical center of the equipment. Therefore, the second image sensor 7 is used to monitor the position of the detected eye, and direct the operator and the subject to align the detected eye with the central axis of the eye lens 4. The position detector 202 is used to monitor the back and forth position of the detected eye relative to the eye lens 4.

The first periocular illumination light source 301 and the second periocular illumination light source 302 are both infrared light sources which are disposed at both sides of the light path. The eye illumination light source 201 and the position detector 202 are disposed obliquely symmetrical about the central axis of the eye (left and right symmetry, namely, when the eye gazes horizontally, the eye illumination light source 201 and the position detector 202 are disposed at the left and right sides), with a degree of inclination of 30-60°. The light of the illumination light source 201 is reflected by the cornea of the eye and introduced into the position detector 202, where the change of the back and forth position of the eye will cause the change of signal distribution in the detector 202. Therefore, by using the detector 202, the back and forth position of the eye can be monitored accurately, namely, the distance from the cornea to the equipment can be determined.

An embodiment of the present disclosure provides a vision detection method, which, based on the vision detection apparatus provided by the embodiments of the present disclosure, includes the following steps:

At step 1, the operator uses the eye position imaging light path to determine the position of the detected eye and complete position alignment of the detected eye.

At step 2, the detected eye is enabled to gaze stable by using the optotype light path; refractive error information detection is performed on the detected eye using the diopter detection light path to obtain a refractive error information detection result corresponding to the detected eye.

At step 3, by using the ocular axial length measurement light path, interference information of the reflective light formed by the fundus and cornea of the detected eye is collected.

At step 4, based on the refractive error information detection result and the ocular axial length, conclusion is made on the vision of the detected eye.

Specifically, firstly, the eye position monitoring light path is used to determine the position of the eye and direct the operator to complete position alignment of the eye. After the eye alignment, the measurement process is started: firstly, the diopter is measured; the diopter is preliminarily calculated based on the annular image in the first image sensor 21, and then based on the preliminarily-calculated diopter, the elements in the dotted line box are moved back and forth, namely, the movable optotype 11, the movable diopter detection light source 16, the movable focusing lens 15, the movable annular diaphragm 14 and the first movable lens 19 are moved synchronously to accurately determine the diopters of the eye.

After the diopter measurement is completed, the ocular axial length is measured. The movable prism component is manipulated to move the second prism 35 back and forth quickly and the signal in the detector 38 is synchronously collected at high speed; the ocular axial length is calculated based on the signal in the detector 38. The detector 38 is used to detect the interference signal: the interference signal is formed by the reflective light of the front surface of the cornea and the reflective light of the fundus. The light of the light source 31 is divided by the light splitter 33 into two parts, one part (reflective light) of which is introduced into the first prism 34 and reflected, and the other part (transmission light) is introduced into the second prism 35 and reflected. The light reflected by the first prism 34 is finally irradiated on the eye and introduced into the fundus, and the fundus-reflected light finally enters the detector 38. The light reflected by the second prism 35 is finally irradiated on the eye and reflected by the surface of the cornea and then into the detector 38. Moving the second prism 35 back and forth can change the optical distance from the cornea-reflected light to the detector 38. When the optical distances of the fundus-reflected light and the cornea-reflected light to the detector 38 are equal, the interference signal is formed. Since the interference signal comes directly from the reflection of the cornea and the fundus, the ocular axial length (the distance from cornea to fundus) can be directly determined based on the movement distance of the second prism 35, in the formula $Le=\rho \lceil xZp$, where Zp refers to the distance of the second prism 35 relative to the system zero point, and p is a proportional constant.

In optical path design, the movable annular diaphragm 14, the first image sensor 21 and the movable optotype 11 form an object-image conjugate relationship. Under the initial structural condition of the optical path, the movable annular diaphragm 14, the first image sensor 21 and the movable optotype 11 form an object-image conjugate relationship with the fundus. The first image sensor 21 can obtain a sharp image of the movable annular diaphragm 14 where the size of the annulus is fixed. But, if there is refractive error with the detected eye, the object-image conjugate relationship will be broken and the eye cannot clearly see the optotype. In this case, the first image sensor 21 can obtain a blurred image of the movable annular diaphragm 14, with its size changed. At this time, the movable annular diaphragm 14, the first image sensor 21 and the movable optotype 11 are moved back and forth. When the movement reaches a particular distance L, the object-image conjugate relationship is restored between the three and the fundus, and the eye can see optotype clearly. In this case, the first image sensor 21 can obtain a sharp image of the movable annular diaphragm 14 with its size restored. There is an equi-proportional relationship between the diopter value and the movement distance L of the three. The Diopter $D=\beta L$, where $\beta$ is a proportional relationship.

In this embodiment, in the optical path design, the ocular axial length measurement light path is substantially disposed on a same plane (optical center coplane) and the diopter detection light path, the optotype light path, the eye position monitoring light path are disposed on the other plane. In this way, a double-layer design can be achieved entirely.

In one word, although the embodiments of the present disclosure have been illustrated, those skilled in the prior arts should understand that various changes, modifications, replacements and variations can be made to the embodiments without departing from the principle and spirit of the present disclosure. The scope of protection of the present disclosure is indicated by the claims and its equivalents.

The invention claimed is:

1. A vision detection apparatus, comprising an eye lens (4), wherein it comprises the followings which are juxtaposed, with the eye lens (4) as a common component:
    an ocular axial length measurement light path for measuring an ocular axial length of a detected eye;
    a diopter detection light path for obtaining refractive error information of the detected eye;
    an optotype light path for providing a fixation image for the detected eye 1 and enabling the detected eye to gaze stably;
    an eye position monitoring light path for performing three-dimensional positioning for the detected eye and collect imaging information of the detected eye,
wherein the ocular axial length measurement light path comprises:
    a light source component (22) for generating a measurement light;
    a light splitter (33), disposed on a propagation path of the measurement light to receive the measurement light and split the measurement light into a reflective light and a transmission light;
    a first prism (34), disposed on a propagation path of the reflective light to reflect the reflective light to form a fundus information collection light retroreflection and transmitted through the light splitter (33);
    a movable prism component (23) (23), disposed on a propagation path of the transmission light to reflect the transmission light to form a cornea information collection light retroreflection and reflected by the light splitter (33);
    a first spectroscope (36), disposed on a propagation path of a transmission light generated by the fundus information collection light transmitted through the light splitter (33) to form an ocular axis information collection light by combining the transmission light generated by the fundus information collection light through the light splitter (33) and the reflective light generated by the cornea information collection light using the light splitter (33);
    an optical line defining module (24), disposed on a propagation path of the ocular axis information collection light to introduce the ocular axis information collection light into the detected eye and reflected by the fundus and cornea of the detected eye back to form an ocular axis information reflective light retroreflected to the first spectroscope (36);
    a measurement signal receiving module (25), disposed on a propagation path of the transmission light generated by the ocular axis information reflective light through the first spectroscope (36) to receive interference information of the transmission light generated by the ocular axis information reflective light through the first spectroscope (36),
    wherein the light source component (22) comprises a light source (31) for generating the measurement light and a first lens (32) disposed on a propagation path of the measurement light, and
    wherein the movable prism component (23) comprises a motor slide bench (39) internally provided with a control system and a second prism disposed on the motor slide bench (39).

2. The vision detection apparatus of claim 1, wherein the optical line defining module (24) comprises a first reflector (30), a second spectroscope (8) and the eye lens (4) disposed along the propagation direction of the ocular axis information collection light.

3. The vision detection apparatus of claim 2, wherein the measurement signal receiving module (25) comprises a second lens (37) and an interference detector (38) disposed along the propagation direction of the transmission light generated by the ocular axis information reflective light through the first spectroscope (36).

4. The vision detection apparatus of claim 3, wherein the diopter detection light path comprises a movable diopter detection light source (16) for sending a diopter detection light, and a movable focusing lens (15), a movable annular diaphragm (14), a third lens (13), a medium-hole reflector (12), a third spectroscope (9), the second spectroscope (8), a fourth spectroscope (5) and the eye lens (4) disposed along the propagation direction of the diopter detection light; after the diopter detection light enters the detected eye, it is reflected by the fundus of the detected eye to form a diopter detection reflective light which is transmitted by the medium-hole reflector (12); the diopter detection light path further comprises a second reflector (17), a fourth lens (18), a first movable lens (19), a fifth lens (20) and a first image sensor (21) disposed along the propagation direction of the diopter detection reflective light transmitted by the medium-hole reflector (12).

5. The vision detection apparatus of claim 4, wherein the optotype light path comprises a movable optotype (11) for generating a fixation light signal as well as a sixth lens (10), the third spectroscope (9), the second spectroscope (8), the fourth spectroscope (5) and the eye lens (4) disposed along the propagation direction of the fixation light signal.

6. The vision detection apparatus of claim 5, wherein the eye position monitoring light path comprises a first periocular illumination light source (301) and a second periocular illumination light source (302), and the first periocular illumination light source (301) and the second periocular illumination light source (302) irradiate the detected eye to form a reflective irradiation light signal; an eye position imaging light path further comprises the eye lens (4), the fourth spectroscope (5), a seventh lens (6), and a second image sensor (7) disposed along the propagation direction of the reflective irradiation light signal as well as an eye illumination light source (201) and a position detector (202) disposed obliquely symmetrical about the central axis of the detected eye; the second image sensor (7) is used to monitor the position of the detected eye and direct an operator and the subject to align the detected eye with the central axis of the eye lens (4); the position detector (202) is used to monitor the back and forth position of the detected eye relative to the eye lens (4).

7. A vision detection method, based on a vision detection apparatus, comprising:
   wherein the vision detection apparatus comprises:
   an eye lens (4), wherein it comprises the followings which are juxtaposed, with the eye lens (4) as a common component:
      an ocular axial length measurement light path for measuring an ocular axial length of a detected eye;
      a diopter detection light path for obtaining refractive error information of the detected eye;
      an optotype light path for providing a fixation image for the detected eye 1 and enabling the detected eye to gaze stably;
      an eye position monitoring light path for performing three-dimensional positioning for the detected eye and collect imaging information of the detected eye,
   wherein the ocular axial length measurement light path comprises:
      a light source component (22) for generating a measurement light;
      a light splitter (33), disposed on a propagation path of the measurement light to receive the measurement light and split the measurement light into a reflective light and a transmission light;
      a first prism (34), disposed on a propagation path of the reflective light to reflect the reflective light to form a fundus information collection light retroreflection and transmitted through the light splitter (33);
      a movable prism component (23) (23), disposed on a propagation path of the transmission light to reflect the transmission light to form a cornea information collection light retroreflection and reflected by the light splitter (33);
      a first spectroscope (36), disposed on a propagation path of a transmission light generated by the fundus information collection light transmitted through the light splitter (33) to form an ocular axis information collection light by combining the transmission light generated by the fundus information collection light through the light splitter (33) and the reflective light generated by the cornea information collection light using the light splitter (33);
      an optical line defining module (24), disposed on a propagation path of the ocular axis information collection light to introduce the ocular axis information collection light into the detected eye and reflected by the fundus and cornea of the detected eye back to form an ocular axis information reflective light retroreflected to the first spectroscope (36);
      a measurement signal receiving module (25), disposed on a propagation path of the transmission light generated by the ocular axis information reflective light through the first spectroscope (36) to receive interference information of the transmission light generated by the ocular axis information reflective light through the first spectroscope (36),
   wherein the light source component (22) comprises a light source (31) for generating the measurement light and a first lens (32) disposed on a propagation path of the measurement light, and
wherein the movable prism component (23) comprises a motor slide bench (39) internally provided with a control system and a second prism disposed on the motor slide bench (39)
   determining a position of a detected eye and completing position alignment of the detected eye by using an eye position imaging light path;
   performing refractive error information detection on the detected eye using the diopter detection light path to obtain a refractive error information detection result corresponding to the detected eye, wherein the detected eye is enabled to gaze stable by using the optotype light path;
   by using the ocular axial length measurement light path, collecting interference information of the reflective light formed by the fundus and cornea of the detected eye; and
   based on the refractive error information detection result and the ocular axial length, making a conclusion on the vision of the detected eye.

\* \* \* \* \*